United States Patent [19]

Brümmer

[11] Patent Number: 5,415,373
[45] Date of Patent: May 16, 1995

[54] HOLLOW MELT CORE HAVING AN OPENING AND COVER WHICH SEALS THE OPENING

[75] Inventor: Michael Brümmer, Laudenbach, Germany

[73] Assignee: Firma Carl Freudenberg, Weinheim, Germany

[21] Appl. No.: 246,436

[22] Filed: May 20, 1994

[30] Foreign Application Priority Data

May 21, 1993 [DE] Germany .............. 43 17 061.7

[51] Int. Cl.⁶ .............................. B29C 33/76
[52] U.S. Cl. ..................... 249/62; 264/221; 264/317; 425/438; 425/542
[58] Field of Search .............. 249/61, 62; 264/221, 264/317, DIG. 44; 425/438, 542

[56] References Cited

U.S. PATENT DOCUMENTS

| | | | |
|---|---|---|---|
| 964,510 | 7/1910 | Gleason | 264/317 |
| 2,280,074 | 4/1942 | Halsall | 249/61 |
| 2,345,977 | 4/1944 | Howald et al. | 249/62 |
| 2,759,231 | 8/1956 | Parlanti | 249/62 |
| 3,692,892 | 9/1972 | Lemelson | 264/317 |
| 4,424,183 | 1/1984 | Nelson | 249/61 |
| 5,173,237 | 12/1992 | Kidd | 249/62 |

FOREIGN PATENT DOCUMENTS 2251435 5/1973 Germany .

Primary Examiner—Jay H. Woo
Assistant Examiner—Robert B. Davis
Attorney, Agent, or Firm—Kenyon & Kenyon

[57] ABSTRACT

A melt core constructed of a low temperature melting point alloy for producing a cavity in a structural part manufactured by injection molding, the melt core being formed as a hollow body. Depending upon the production process employed, the hollow body is provided with an opening, which is tightly sealed by a separately produced cover constructed of the same material as the hollow body that it seals.

7 Claims, 2 Drawing Sheets

HOLLOW MELT CORE HAVING AN OPENING AND COVER WHICH SEALS THE OPENING

BACKGROUND OF THE INVENTION

The invention relates generally to a hollow body type melt core of the type comprising a low-melting point temperature metal alloy for producing a cavity in a structural part manufactured by means of injection molding.

Melt cores, which are designed as hollow bodies that are open on one side, are generally known (see German Patent 2251435, the contents of which are incorporated herein by reference). To reduce the cycle time taken up by the melting of the core, large-volume melt cores are typically produced as hollow bodies. In the known methods, the melt cores are hollowed out, for example, by means of slide valves, thereby necessitating that the recess thereby created must be sealed again by a slide valve on the die. Depending upon the particular manufacturing process employed, an opening is formed in the structural part in the area where the slide valve of the die seals the hollow body, and after the core is melted, this opening is sealed by a core-hole cover. The costs for the die are increased because of the slide valve that is employed to seal the cavity of the melt core. This has the overall effect of lengthening the time required to manufacture an injected structural part.

There remains a need to further develop a melt core of the previously known type, so that subsequent sealing by means of an additional slide valve in the die is no longer needed, and the cycle times for producing structural parts can thus be shortened and manufacturing cost are reduced.

SUMMARY OF THE INVENTION

The present invention meets this need by providing a hollow melt-core made of metal having a low melting point temperature. According to the present invention, the melt core is provided as a hollow body having an opening which, depending on the production process, is tightly sealed by a separately produced cover made of the same material. It is advantageous that the melt core is closed upon itself and can be inserted into the casting mold, without requiring openings formed in the structural part to be cast (depending on the production process employed) that have to be sealed later on. Because the hollow body and the cover are made of the same material, they can be recovered together when the core is melted. The wall thickness of the hollow body, as well as the configuration of the attachment of the cover inside the opening, is designed to withstand the pressing forces generated during injection molding. As the melt core is designed as a hollow body, it can be tempered within short times and readily be smelted following the manufacturing of the structural part. Moreover, when manufactured structural parts are made, it is not necessary to seal the openings with core-hole covers. The net result is that time saved in manufacturing the injection-molded structural part is substantially greater than the time required for the manufacture of the cover for the melt core and the subsequent insertion of this cover in a tight-fitting manner into the hollow body.

The metal alloy of which the core is made can consist of mainly tin and bismuth. It is advantageous that this material can be obtained inexpensively in large quantities and is simple to machine. The opening of the hollow body and the cover are preferably pressed sealingly together, so as to cause the metal alloy to plastically flow in the edge area while the cover is pressed into the opening of the hollow body, which provides a secure interference fit between the two.

When an interference fit is used, the cover and the hollow body are joined together along flush surfaces. The use of flush-surfaces is advantageous because it alleviates the need to rework the injection-molded structural part subsequent to its manufacture on the part side facing the opening of the melt core.

The edge area of the hollow body that borders the opening can have a truncated-cone-shaped cross-section in one partial area of its axial extent, which widens in the direction of the surroundings and engages with a congruently formed peripheral area of the cover. When the opening is sealed, the cover can be retained outside of the hollow body so that it is secured against loss. Another advantage of this feature is that the cross-section of the opening, which widens in a truncated-cone shape, forms a limit stop for the cover. This considerably simplifies the process of fixing the cover into the opening of the hollow body. Moreover, it is quite significant that the pressures formed during the injection molding operation are absorbed by the truncated-cone-shaped bearing surface of the cover and the opening. As the pressures of injection molding rise, the hollow body and the cover are pressed together with greater force. Consequently, the cover cannot become unintentionally loosened from the opening.

DETAILED DESCRIPTION

Figure 1:
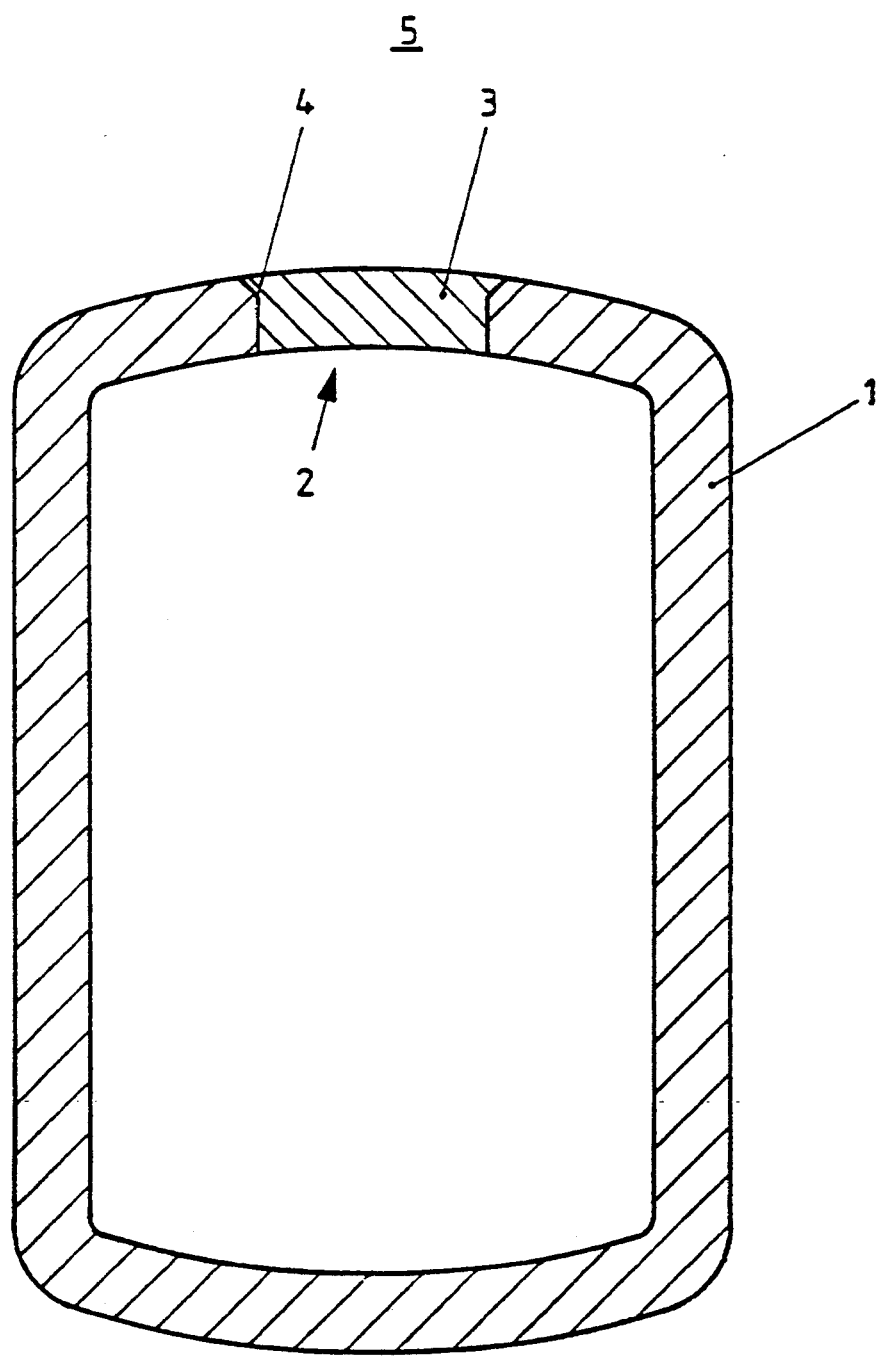
FIG. 1 is a longitudinal cross-sectional view of a melt core constructed according to the principles of the invention.
Figure 2:
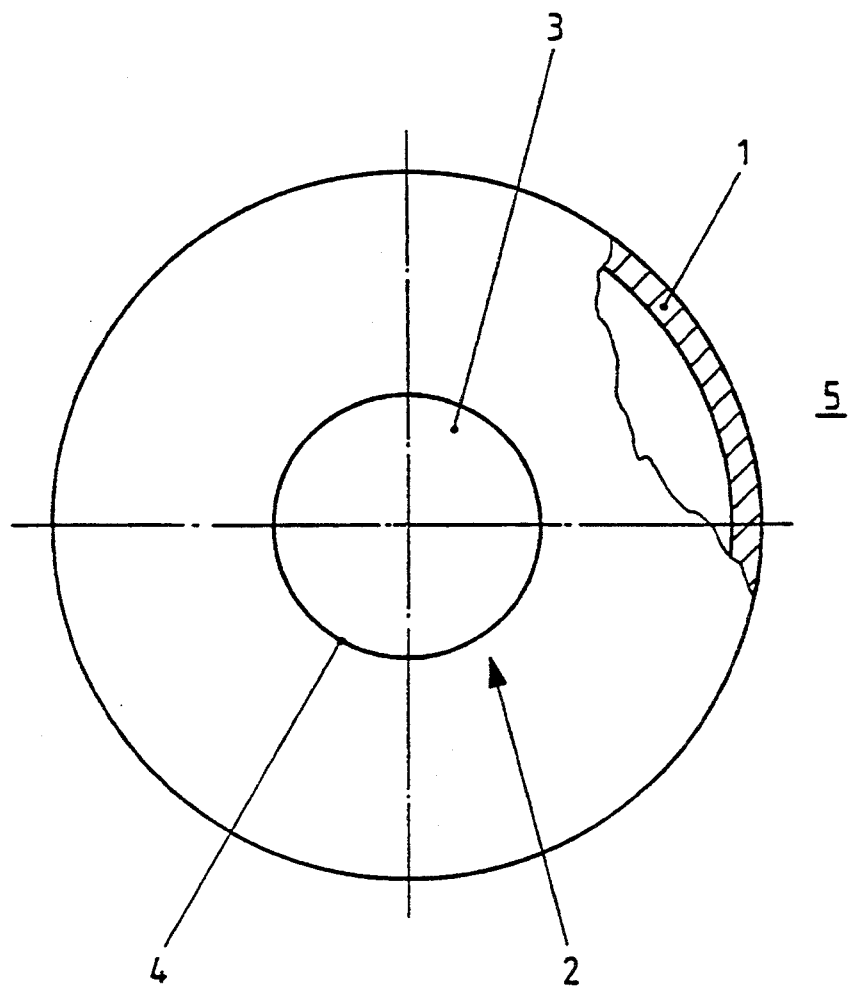
FIG. 2 depicts a partial sectional view of the melt core from FIG. 1 as viewed from above.

FIGS. 1 and 2 depict a melt core constructed of a metal alloy having a low melting point. The core is formed as a hollow body 1, having an opening 2 sealable by a cover 3. The hollow body 1 and the cover 3 are made of the same material. The cover 3 and the hollow body 1 are pressed together. The edge area 4 of the opening 2 and the cover 3 are formed in a complementary truncated-cone shape in an area of their periphery to facilitate the pressing together of the cover 3 and the hollow body 1. In this embodiment, the cone angle of this area is 45°. Other cone angles, particularly those between 30° and 60°, are also suitable. The sealing pressing action between the edge area 4 of the opening 2 and the cover 3 takes place in the cylindrical portion of this region. The truncated-cone-shaped area forms a limit stop for the exact axial positioning of the cover inside the opening.

FIG. 2 shows a top view of the hollow body 1 of FIG. 1. The hollow body 1 and its opening 2, as well as the cover 3, have a dynamically balanced design in this embodiment. During injection molding, the surroundings 5 inside the casting mold that are external to the core are completely filled by the material of which the structural part is cast. The process of injection molding generates internal pressures that are transferred to the melt core. However, the wall thickness of the cavity 1, as well as the mechanical connection between the cavity 1 and the cover 3 are designed to withstand the pressing forces generated during injection molding.

What is claimed is:

1. A melt core for producing a cavity in a structural part manufactured by means of injection molding, the melt core comprising:

a hollow body constructed of a metal having a low-melting point temperature, the hollow body having an opening; and a cover configured to tightly fit with the opening of the hollow body and provide a seal with respect thereto, said cover being constructed of the same material as the hollow body.

2. The melt core according to claim 1, wherein the metal is an alloy that consists essentially of tin and bismuth.

3. The melt core according to claim 1, wherein the opening and the cover are pressed together by means of a press interference fit, and the cover and the hollow body are joined together along flush surfaces.

4. The melt core according to claim 2, wherein the opening and the cover are pressed together by means of a press interference fit, and the cover and the hollow body are joined together along flush surfaces.

5. The melt core according to claim 1, wherein the opening of the hollow body has an edge portion that comprises a portion of a mouth leading into the interior of the hollow body, the mouth having a truncated-cone-shaped cross-section in one partial area of its axial extent, which widens in the direction of the exterior of the hollow body and wherein the mouth and cover are configured to mate with each other.

6. The melt core according to claim 2, wherein the opening of the hollow body has an edge portion that comprises a portion of a mouth leading into the interior of the hollow body, the mouth having a truncated-cone-shaped cross-section in one partial area of its axial extent, which widens in the direction of the exterior of the hollow body and wherein the mouth and cover are configured to mate with each other.

7. The melt core according to claim 3, wherein the opening of the hollow body has an edge portion that comprises a portion of a mouth leading into the interior of the hollow body, the mouth having a truncated-cone-shaped cross-section in one partial area of its axial extent, which widens in the direction of the exterior of the hollow body and wherein the mouth and cover are configured to mate with each other.

* * * * *